(12) United States Patent
Chung et al.

(10) Patent No.: US 7,707,444 B2
(45) Date of Patent: Apr. 27, 2010

(54) SWITCHING MODE POWER SUPPLY

(75) Inventors: Shin-Hong Chung, Guangdong (CN);
Kuan-Hong Hsieh, Guangdong (CN);
Han-Che Wang, Guangdong (CN)

(73) Assignee: Hon Hai Precision Industry Co., Ltd.,
Tu-Cheng, Taipei Hsien (TW)

( * ) Notice: Subject to any disclaimer, the term of this patent is extended or adjusted under 35 U.S.C. 154(b) by 708 days.

(21) Appl. No.: 11/558,428

(22) Filed: Nov. 9, 2006

(65) Prior Publication Data

US 2007/0109818 A1    May 17, 2007

(30) Foreign Application Priority Data

Nov. 11, 2005    (CN)    .................... 2005 1 0101201

(51) Int. Cl.
*G06F 1/00*     (2006.01)
*H02M 7/00*    (2006.01)
*H02M 3/335*  (2006.01)
*G05F 1/00*     (2006.01)
*H01F 38/00*   (2006.01)

(52) U.S. Cl. .................... 713/323; 713/300; 363/13; 363/21.11; 363/21.18; 323/287; 323/355

(58) Field of Classification Search ................. 713/300, 713/323; 363/13, 21.11, 21.18; 323/287, 323/355
See application file for complete search history.

(56) References Cited

U.S. PATENT DOCUMENTS

| | | | |
|---|---|---|---|
| 4,890,210 A | 12/1989 | Myers | |
| 4,945,465 A | 7/1990 | Marinus et al. | |
| 5,313,381 A * | 5/1994 | Balakrishnan | ............... 363/147 |
| 5,636,107 A * | 6/1997 | Lu et al. | ...................... 363/20 |
| 5,694,304 A * | 12/1997 | Telefus et al. | ............ 363/21.03 |
| 5,712,772 A * | 1/1998 | Telefus et al. | ............ 363/21.02 |
| 5,754,415 A | 5/1998 | Blackmon | |
| 6,011,702 A | 1/2000 | Gucyski | |
| 7,012,817 B2 * | 3/2006 | Liu et al. | ...................... 363/20 |
| 7,061,778 B2 | 6/2006 | Odell et al. | |

FOREIGN PATENT DOCUMENTS

| | | |
|---|---|---|
| CN | 1041248 | 4/1990 |
| JP | 6-62568 | 3/1994 |
| JP | 2002-238256 | 8/2002 |

* cited by examiner

*Primary Examiner*—Thuan N Du
*Assistant Examiner*—Stefan Stoynov
(74) *Attorney, Agent, or Firm*—Winston Hsu

(57) ABSTRACT

A switching mode power supply includes a transformer which includes a primary winding and two secondary windings. One secondary winding and the primary winding constitute a forward circuit. The other secondary winding and the primary winding constitute a flyback circuit. The switching mode power supply also includes a power storing circuit and an output terminal. The power storing circuit is interposed between the forward circuit, the flyback circuit, and the output terminal.

5 Claims, 2 Drawing Sheets

SWITCHING MODE POWER SUPPLY

TECHNICAL FIELD

The present invention relates to switching mode power supplies, and particularly to a switching mode power supply in which a forward circuit and a flyback circuit share one transformer.

RELATED ART

Generally, in most traditional switching mode power supplies, only forward circuits or flyback circuits are adopted. If in situations both a forward circuit and a flyback circuit are adopted, the flyback circuit is usually configured separately from the forward circuit. That is, the forward circuit and the flyback circuit are respectively constituted by different transformers. Hence, when the forward circuit or the flyback circuit transfers electrical power to loads, an amount of electrical power is converted into magnetic power and stored in a core of a transformer constituting the forward circuit or the flyback circuit. The magnetic power is consumed in a form of heat, reducing a transfer rate of electrical power to the loads.

Therefore, there is a need for providing a switching mode power supply which can solve the above-mentioned problem.

SUMMARY

A switching mode power supply, includes: a direct current (DC) power source; a transformer connected to the DC power source and including a primary winding, a first secondary winding and a second secondary winding; an output terminal connected to the transformer; a pulse-width modulation (PWM) circuit for producing PWM wave; and a switching circuit under control of the PWM circuit by applying PWM wave thereto and connected with the primary winding of the transformer. The switching mode power supply further includes: a first rectification circuit connected to the first secondary winding and constitutes a forward circuit together with the primary winding and the first secondary winding; and a second rectification circuit connected to the second secondary winding and constitutes a flyback circuit together with the primary winding and the second secondary winding.

Other advantages and novel features will be drawn from the following detailed description with reference to the attached drawings, in which:

DETAILED DESCRIPTION OF THE EMBODIMENTS

Figure 1:
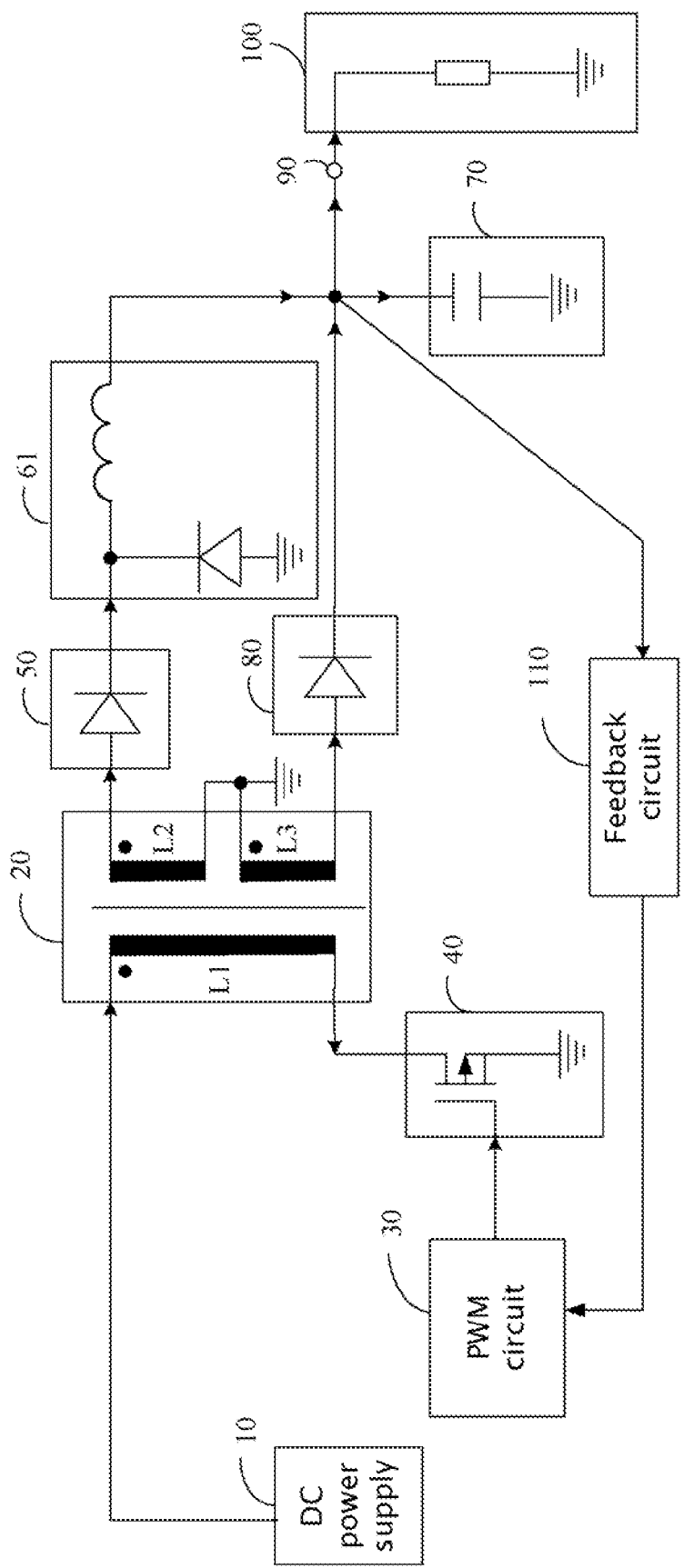
FIG. 1 depicts an exemplary circuit diagram of a switching mode power supply in accordance with a first preferred embodiment of the present invention.

Referring to FIG. 1, an exemplary circuit diagram of a switching mode power supply in accordance with a first preferred embodiment is shown. In this preferred embodiment, the switching mode power supply mainly includes a direct current power source 10 (simplified as "a DC source 10"), a transformer 20, a pulse-width modulation (PWM) circuit 30, a switching circuit 40, and an output terminal 90. The transformer 20 is interposed between the DC source 10 and the switching circuit 40. The switching circuit 40 is controlled by the PWM circuit 30. The PWM circuit 30 receives feedback from a feedback circuit 110 and applies PWM waves to the switching circuit 40 accordingly. The switching circuit 40 is therefore switched on and off in accordance with the PWM waves and controls the flow of power through the transformer 20. The feedback circuit 110 is connected with the output terminal 90 and feeds back output information to a load 100 through the output terminal 90.

The transformer 20 includes at least one primary winding L1 and two secondary windings L2 and L3. A dotted terminal of the primary winding L1 is connected with the DC power source 10 and an undotted terminal thereof is connected with the switching circuit 40. A dotted terminal of the secondary winding L2 is connected with a first rectification circuit 50 and an undotted terminal thereof is grounded together with a dotted terminal of the secondary winding L3. An undotted terminal of the secondary winding L3 is connected with a second rectification circuit 80.

The primary winding L1, the secondary winding L2, and the first rectification circuit 50 constitutes a forward circuit, and the primary winding L1, the secondary winding L3, and the second rectification circuit 80 constitutes a flyback circuit. In this preferred embodiment, the forward circuit is connected to the output terminal 90 via a power storing circuit 61, and the flyback circuit is directly connected to the output terminal 90.

When the switching circuit 40 is switched on by the PWM circuit 30, power enters the dotted terminal of the primary winding L1 of the transformer 20, and meanwhile the forward circuit functions. The power is transferred to the secondary winding L1 from the primary winding L1. The power is further transferred by the secondary winding L2 to the power storing circuit 61 via the first rectification circuit 50 and stored in the power storing circuit 61. When the switching circuit 40 is switched off by the PWM circuit 30, the flyback circuit functions. The flyback circuit converts magnetic power stored in the core of the transformer 20 into electrical power and transfers the electrical power to the output terminal 90. At the same time, the power storing circuit 61 also deliveries power to the output terminal 90.

Figure 2:
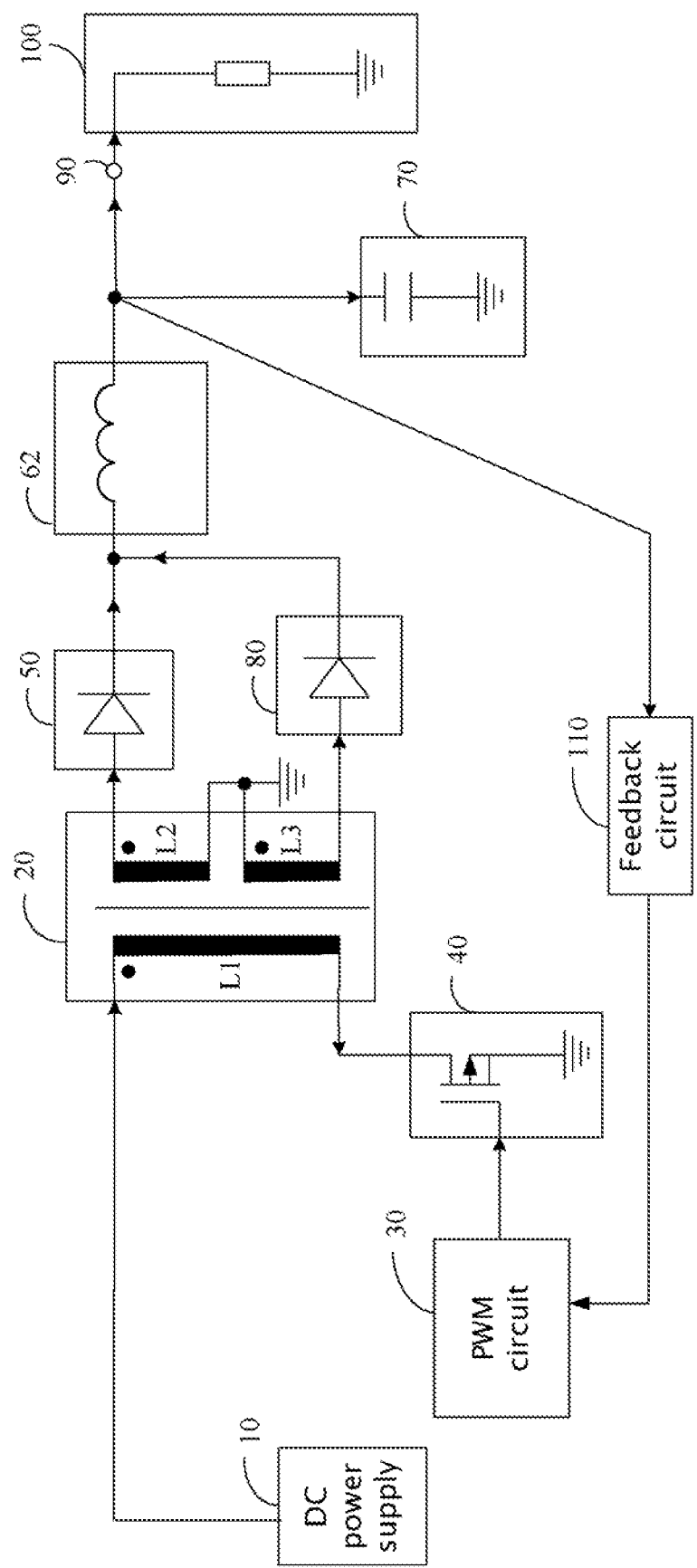
FIG. 2 depicts an exemplary circuit diagram of the switching mode power supply in accordance with a second preferred embodiment of the present invention.

Referring to FIG. 2, a switching mode power supply in accordance with a second embodiment is shown. In FIG. 2, similar components to those of FIG. 1 have the same or a corresponding reference numeral, and explanation thereof will be omitted. In FIG. 2, the first rectification circuit 50 and the second rectification circuit 80 both are connected to a second power storing circuit 62. Therefore, the power transferred by the forward circuit and the flyback circuit is stored in the second power storing circuit 62 and delivered to the output terminal 90 by the second power storing circuit 62.

In both FIGS. 1 and 2, the switching circuit 40 is shown as presented by a FET (field-effect transistor) transistor, and the first rectification circuit 50 and the second rectification circuit 80 are shown as presented by a Schottky diode. The power storing circuit 61 in FIG. 1 is shown constituted by a diode and an inductor connected in series. The inductor is interposed between the first rectification circuit 50 and the output terminal 90. An anode of the diode is grounded and a cathode thereof is connected between the first rectification circuit 50 and the inductor. The diode, the inductor, and the load 100 form a current loop. The current loop enables the power stored in the power storing circuit 61 to be delivered to the load 100 after the forward circuit finishes the transferring of power to the power storing circuit 61. The second power storing circuit 62 in FIG. 2 is shown as presented by an inductor.

The switching mode power supply further includes a filter circuit 70 interposed between the output terminal 90 and the ground, and used for reducing current ripples output to the load 100 and fed back to the PWM circuit 30.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A switching mode power supply, comprising:
   a transformer connected to a DC power source and comprising a primary winding, a first secondary winding, and a second secondary winding;
   an output terminal connected to the transformer;
   a pulse-width modulation (PWM) circuit for producing PWM wave;
   a switching circuit under control of the PWM circuit by applying PWM wave thereto and connected with the primary winding of the transformer;
   a first rectification circuit connected to the first secondary winding and constituting a forward circuit together with the primary winding and the first secondary winding;
   a second rectification circuit connected to the second secondary winding and constituting a flyback circuit together with the primary winding and the second secondary winding; and
   a power storing circuit interposed between the forward circuit, the flyback circuit, and the output terminal.

2. The switching mode power supply as claimed in claim 1, further comprising a filter circuit for filtering current ripples output by the output terminal.

3. The switching mode power supply as claimed in claim 1, further comprising a feedback circuit for feeding back information on output of the output terminal.

4. The switching mode power supply as claimed in claim 1, wherein the first rectification circuit comprises a Schottky diode.

5. The switching mode power supply as claimed in claim 1, wherein the second rectification circuit comprises a Schottky diode.

* * * * *